(12) United States Patent
Ramesh et al.

(10) Patent No.: US 10,049,207 B2
(45) Date of Patent: Aug. 14, 2018

(54) METHODS OF OPERATING STORAGE SYSTEMS INCLUDING ENCRYPTING A KEY SALT

(71) Applicant: MICRON TECHNOLOGY, INC., Boise, ID (US)

(72) Inventors: Ahuja Gurmukhsingh Ramesh, San Jose, CA (US); Senthil Kumar Chellamuthu, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/399,779

(22) Filed: Jan. 6, 2017

(65) Prior Publication Data

US 2017/0124318 A1 May 4, 2017

Related U.S. Application Data

(60) Division of application No. 14/081,124, filed on Nov. 15, 2013, now Pat. No. 9,576,154, which is a division
(Continued)

(51) Int. Cl.
*G06F 21/45* (2013.01)
*G06F 12/14* (2006.01)
(Continued)

(52) U.S. Cl.
CPC .......... *G06F 21/45* (2013.01); *G06F 12/1433* (2013.01); *G06F 21/78* (2013.01);
(Continued)

(58) Field of Classification Search
CPC .. G06F 21/72; G06F 21/10; G06F 2221/2107; H04L 9/08; H04L 63/0428
(Continued)

(56) References Cited

U.S. PATENT DOCUMENTS 4,099,069 A 7/1978 Cricchi et al.
4,130,900 A 12/1978 Watanabe
(Continued)

FOREIGN PATENT DOCUMENTS

AU 0 557 723 8/1987
EP 0 220 718 A2 5/1987
(Continued)

OTHER PUBLICATIONS

Kai Hwang & Faye A. Briggs, *Computer Architecture and Parallel Processing*, McGraw-Hill Book Co., 1984, p. 64.
(Continued)

*Primary Examiner* — Farid Homayounmehr
*Assistant Examiner* — Sanchit Sarker
(74) *Attorney, Agent, or Firm* — Dicke, Billig & Czaja, PLLC

(57) ABSTRACT

A method of operating a storage system includes using the device driver to combine a password, the key salt, and the number of iterations to generate a primary key, using the device driver to generate a key schedule from the primary key, receiving an encrypted master key at the device driver, and using the device driver to decrypt the encrypted master key with the key schedule.

20 Claims, 12 Drawing Sheets

Related U.S. Application Data of application No. 13/419,964, filed on Mar. 14, 2012, now Pat. No. 8,612,671, which is a division of application No. 12/968,512, filed on Dec. 15, 2010, now Pat. No. 8,151,041, which is a continuation of application No. 12/115,170, filed on May 5, 2008, now Pat. No. 7,865,659, which is a continuation of application No. 11/118,959, filed on Apr. 29, 2005, now Pat. No. 7,370,166.

(60) Provisional application No. 60/567,132, filed on Apr. 30, 2004.

(51) Int. Cl.
  *G06F 21/78* (2013.01)
  *H04L 9/08* (2006.01)
  *H04L 9/14* (2006.01)

(52) U.S. Cl.
  CPC .......... *H04L 9/0822* (2013.01); *H04L 9/0863* (2013.01); *H04L 9/14* (2013.01); *G06F 2212/1052* (2013.01)

(58) Field of Classification Search
  USPC .......................................... 713/189; 380/277
  See application file for complete search history.

(56) References Cited

U.S. PATENT DOCUMENTS

| | | |
|---|---|---|
| 4,210,959 A | 7/1980 | Wozniak |
| 4,309,627 A | 1/1982 | Tabata |
| 4,355,376 A | 10/1982 | Gould |
| 4,398,248 A | 8/1983 | Hsia et al. |
| 4,405,952 A | 9/1983 | Slakmon |
| 4,414,627 A | 11/1983 | Nakamura |
| 4,450,559 A | 5/1984 | Bond et al. |
| 4,456,971 A | 6/1984 | Fukuda et al. |
| 4,468,730 A | 8/1984 | Dodd et al. |
| 4,473,878 A | 9/1984 | Zolnowsky et al. |
| 4,476,526 A | 10/1984 | Dodd |
| 4,498,146 A | 2/1985 | Martinez |
| 4,525,839 A | 6/1985 | Nozawa et al. |
| 4,532,590 A | 7/1985 | Wallach et al. |
| 4,609,833 A | 9/1986 | Gutterman |
| 4,616,311 A | 10/1986 | Sato |
| 4,654,847 A | 3/1987 | Dutton |
| 4,710,871 A | 12/1987 | Belknap et al. |
| 4,746,998 A | 5/1988 | Robinson et al. |
| 4,748,320 A | 5/1988 | Yorimoto et al. |
| 4,757,474 A | 7/1988 | Fukushi et al. |
| 4,774,700 A | 9/1988 | Satoh et al. |
| 4,780,855 A | 10/1988 | Iida et al. |
| 4,788,665 A | 11/1988 | Fukuda et al. |
| 4,797,543 A | 1/1989 | Watanabe |
| 4,800,520 A | 1/1989 | Iijima |
| 4,829,169 A | 5/1989 | Watanabe |
| 4,843,224 A | 6/1989 | Ohta et al. |
| 4,896,262 A | 1/1990 | Wayama et al. |
| 4,914,529 A | 4/1990 | Bonke |
| 4,920,518 A | 4/1990 | Nakamura et al. |
| 4,924,331 A | 5/1990 | Robinson et al. |
| 4,943,745 A | 7/1990 | Watanabe et al. |
| 4,944,008 A * | 7/1990 | Piosenka .................. G06F 21/62 380/46 |
| 4,953,122 A | 8/1990 | Williams |
| 4,970,642 A | 11/1990 | Yamamura |
| 4,970,727 A | 11/1990 | Miyawaki et al. |
| 5,070,474 A | 12/1991 | Tuma et al. |
| 5,093,785 A | 3/1992 | Iljima |
| 5,168,465 A | 12/1992 | Harari |
| 5,198,380 A | 3/1993 | Harari |
| 5,200,959 A | 4/1993 | Gross et al. |
| 5,218,695 A | 6/1993 | Noveck et al. |
| 5,220,518 A | 6/1993 | Haq |
| 5,226,168 A | 7/1993 | Kobayashi et al. |
| 5,227,714 A | 7/1993 | Lou |
| 5,253,351 A | 10/1993 | Yamamoto et al. |
| 5,267,218 A | 11/1993 | Elbert |
| 5,268,318 A | 12/1993 | Harari |
| 5,268,870 A | 12/1993 | Harari |
| 5,270,979 A | 12/1993 | Harari et al. |
| 5,293,560 A | 3/1994 | Harari |
| 5,297,148 A | 3/1994 | Harari et al. |
| 5,303,198 A | 4/1994 | Adachi et al. |
| 5,305,276 A | 4/1994 | Uenoyama |
| 5,305,278 A | 4/1994 | Inoue |
| 5,315,541 A | 5/1994 | Harari et al. |
| 5,315,558 A | 5/1994 | Hag |
| 5,329,491 A | 7/1994 | Brown et al. |
| 5,337,275 A | 8/1994 | Garner |
| 5,341,330 A | 8/1994 | Wells et al. |
| 5,341,339 A | 8/1994 | Wells |
| 5,341,341 A | 8/1994 | Fukuzo |
| 5,353,256 A | 10/1994 | Fandrich et al. |
| 5,357,475 A | 10/1994 | Hasbun et al. |
| 5,359,569 A | 10/1994 | Fujita et al. |
| 5,365,127 A | 11/1994 | Manley |
| 5,369,615 A | 11/1994 | Harari et al. |
| 5,371,702 A | 12/1994 | Nakai et al. |
| 5,381,539 A | 1/1995 | Yanai et al. |
| 5,382,839 A | 1/1995 | Shinohara |
| 5,384,743 A | 1/1995 | Rouy |
| 5,388,083 A | 2/1995 | Assar et al. |
| 5,396,468 A | 3/1995 | Harari et al. |
| 5,404,485 A | 4/1995 | Ban |
| 5,406,527 A | 4/1995 | Honma |
| 5,418,752 A | 5/1995 | Harari et al. |
| 5,422,842 A | 6/1995 | Cernea et al. |
| 5,422,856 A | 6/1995 | Sasaki et al. |
| 5,428,621 A | 6/1995 | Mehrotra et al. |
| 5,430,682 A | 7/1995 | Ishikawa et al. |
| 5,430,859 A | 7/1995 | Norman et al. |
| 5,431,330 A | 7/1995 | Wieres |
| 5,434,825 A | 7/1995 | Harari |
| 5,438,573 A | 8/1995 | Mangan et al. |
| 5,465,235 A | 11/1995 | Miyamoto |
| 5,465,338 A | 11/1995 | Clay |
| 5,471,478 A | 11/1995 | Mangan et al. |
| 5,473,765 A | 12/1995 | Gibbons et al. |
| 5,479,638 A | 12/1995 | Assar et al. |
| 5,485,595 A | 1/1996 | Assar et al. |
| 5,490,117 A | 2/1996 | Oda et al. |
| 5,495,442 A | 2/1996 | Cernea et al. |
| 5,504,760 A | 4/1996 | Harari et al. |
| 5,508,971 A | 4/1996 | Cernea et al. |
| 5,513,138 A | 4/1996 | Manabe et al. |
| 5,515,333 A | 5/1996 | Fujita et al. |
| 5,519,847 A | 5/1996 | Fandrich et al. |
| 5,523,980 A | 6/1996 | Sakui et al. |
| 5,524,230 A | 6/1996 | Sakaue et al. |
| 5,530,673 A | 6/1996 | Tobita et al. |
| 5,530,828 A | 6/1996 | Kaki et al. |
| 5,530,938 A | 6/1996 | Akasaka et al. |
| 5,532,962 A | 7/1996 | Auclair et al. |
| 5,532,964 A | 7/1996 | Cernea et al. |
| 5,534,456 A | 7/1996 | Yuan et al. |
| 5,535,328 A | 7/1996 | Harari et al. |
| 5,541,551 A | 7/1996 | Brehner et al. |
| 5,544,118 A | 8/1996 | Harari |
| 5,544,356 A | 8/1996 | Robinson et al. |
| 5,552,698 A | 9/1996 | Tai et al. |
| 5,554,553 A | 9/1996 | Harari |
| 5,563,825 A | 10/1996 | Cernea et al. |
| 5,566,314 A | 10/1996 | DeMarco et al. |
| 5,568,439 A | 10/1996 | Harari |
| 5,572,466 A | 11/1996 | Sukegawa |
| 5,579,502 A | 11/1996 | Konishi et al. |
| 5,581,723 A | 12/1996 | Hasbun et al. |
| 5,583,812 A | 12/1996 | Harari |
| 5,592,415 A | 1/1997 | Kato et al. |
| 5,592,420 A | 1/1997 | Cernea et al. |
| 5,596,526 A | 1/1997 | Assar et al. |

(56) References Cited

U.S. PATENT DOCUMENTS

| | | | |
|---|---|---|---|
| 5,598,370 A | 1/1997 | Niijima et al. | |
| 5,602,987 A | 2/1997 | Harari et al. | |
| 5,603,001 A | 2/1997 | Sukegawa et al. | |
| 5,606,660 A | 2/1997 | Estakhri et al. | |
| 5,611,067 A | 3/1997 | Okamoto et al. | |
| 5,640,528 A | 6/1997 | Harney et al. | |
| 5,642,312 A | 6/1997 | Harari | |
| 5,648,929 A | 7/1997 | Miyamoto | |
| 5,663,901 A | 9/1997 | Wallace et al. | |
| 5,693,570 A | 12/1997 | Cernea et al. | |
| 5,694,600 A * | 12/1997 | Khenson | G06F 3/0601 713/2 |
| 5,712,819 A | 1/1998 | Harari | |
| 5,719,808 A | 2/1998 | Harari et al. | |
| 5,723,990 A | 3/1998 | Roohparvar | |
| 5,734,567 A | 3/1998 | Griffiths et al. | |
| 5,745,418 A | 4/1998 | Ma et al. | |
| 5,754,567 A | 5/1998 | Norman | |
| 5,757,712 A | 5/1998 | Nagel et al. | |
| 5,758,100 A | 5/1998 | Odisho | |
| 5,761,117 A | 6/1998 | Uchino et al. | |
| 5,768,190 A | 6/1998 | Tanaka et al. | |
| 5,768,195 A | 6/1998 | Nakamura et al. | |
| 5,773,901 A | 6/1998 | Kantner | |
| 5,778,418 A | 7/1998 | Auclair et al. | |
| 5,781,478 A | 7/1998 | Takeuchi et al. | |
| 5,787,445 A | 7/1998 | Daberko | |
| 5,787,484 A | 7/1998 | Norman | |
| RE35,881 E | 8/1998 | Barrett et al. | |
| 5,799,168 A | 8/1998 | Ban | |
| 5,802,551 A | 9/1998 | Komatsu et al. | |
| 5,809,515 A | 9/1998 | Kaki et al. | |
| 5,809,558 A | 9/1998 | Matthews et al. | |
| 5,809,560 A | 9/1998 | Schneider | |
| 5,818,350 A | 10/1998 | Estakhri et al. | |
| 5,818,781 A | 10/1998 | Estakhri et al. | |
| 5,822,245 A | 10/1998 | Gupta et al. | |
| 5,822,252 A | 10/1998 | Lee et al. | |
| 5,822,781 A | 10/1998 | Wells et al. | |
| 5,831,929 A | 11/1998 | Manning | |
| 5,835,935 A | 11/1998 | Estakhri et al. | |
| 5,838,614 A | 11/1998 | Estakhri et al. | |
| 5,845,313 A | 12/1998 | Estakhri et al. | |
| 5,847,552 A | 12/1998 | Brown | |
| 5,860,083 A | 1/1999 | Sukegawa | |
| 5,860,124 A | 1/1999 | Matthews et al. | |
| 5,862,099 A | 1/1999 | Gannage et al. | |
| 5,890,192 A | 3/1999 | Lee et al. | |
| 5,901,086 A | 5/1999 | Wang et al. | |
| 5,907,856 A | 5/1999 | Estakhri et al. | |
| 5,909,586 A | 6/1999 | Anderson | |
| 5,920,884 A | 7/1999 | Jennings, III et al. | |
| 5,924,113 A | 7/1999 | Estakhri et al. | |
| 5,928,370 A | 7/1999 | Asnaashari | |
| 5,930,815 A | 7/1999 | Estakhri et al. | |
| 5,933,368 A | 8/1999 | Ma et al. | |
| 5,933,846 A | 8/1999 | Endo | |
| 5,936,971 A | 8/1999 | Harari et al. | |
| 5,937,425 A | 8/1999 | Ban | |
| 5,953,737 A | 9/1999 | Estakhri et al. | |
| 5,956,473 A | 9/1999 | Ma et al. | |
| 5,959,926 A | 9/1999 | Jones et al. | |
| 5,966,727 A | 10/1999 | Nishino | |
| 5,986,933 A | 11/1999 | Takeuchi et al. | |
| 5,987,563 A | 11/1999 | Itoh et al. | |
| 5,987,573 A | 11/1999 | Hiraka | |
| 5,991,849 A | 11/1999 | Yamada et al. | |
| 6,011,322 A | 1/2000 | Stumfall et al. | |
| 6,011,323 A | 1/2000 | Camp | |
| 6,016,402 A | 1/2000 | Thomas et al. | |
| 6,018,265 A | 1/2000 | Keshtbod | |
| 6,021,408 A | 2/2000 | Ledain et al. | |
| 6,026,020 A | 2/2000 | Matsubara et al. | |
| 6,026,027 A | 2/2000 | Terrell, II et al. | |
| 6,034,897 A | 3/2000 | Estakhri et al. | |
| 6,035,357 A | 3/2000 | Sakaki | |
| 6,040,997 A | 3/2000 | Estakhri | |
| 6,047,352 A | 4/2000 | Lakhani et al. | |
| 6,055,184 A | 4/2000 | Acharya et al. | |
| 6,055,188 A | 4/2000 | Takeuchi et al. | |
| 6,069,827 A | 5/2000 | Sinclair | |
| 6,072,796 A | 6/2000 | Christensen et al. | |
| 6,076,137 A | 6/2000 | Asnaashari | |
| 6,081,447 A | 6/2000 | Lofgren et al. | |
| 6,081,878 A | 6/2000 | Estakhri et al. | |
| 6,084,483 A | 7/2000 | Keshtbod | |
| 6,097,666 A | 8/2000 | Sakui et al. | |
| 6,115,785 A | 9/2000 | Estakhri et al. | |
| 6,122,195 A | 9/2000 | Estakhri et al. | |
| 6,125,424 A | 9/2000 | Komatsu et al. | |
| 6,125,435 A | 9/2000 | Estakhri et al. | |
| 6,128,695 A | 10/2000 | Estakhri et al. | |
| 6,134,145 A | 10/2000 | Wong | |
| 6,134,151 A | 10/2000 | Estakhri et al. | |
| 6,141,249 A | 10/2000 | Estakhri et al. | |
| 6,145,051 A | 11/2000 | Estakhri et al. | |
| 6,151,247 A | 11/2000 | Estakhri et al. | |
| 6,172,906 B1 | 1/2001 | Estakhri et al. | |
| 6,173,362 B1 | 1/2001 | Yoda | |
| 6,181,118 B1 | 1/2001 | Meehan et al. | |
| 6,182,162 B1 | 1/2001 | Estakhri et al. | |
| 6,202,138 B1 | 3/2001 | Estakhri et al. | |
| 6,223,308 B1 | 4/2001 | Estakhri et al. | |
| 6,226,708 B1 | 5/2001 | McGoldrick et al. | |
| 6,230,234 B1 | 5/2001 | Estakhri et al. | |
| 6,259,789 B1 * | 7/2001 | Paone | H04L 9/0631 380/28 |
| 6,262,918 B1 | 7/2001 | Estakhri et al. | |
| 6,266,415 B1 * | 7/2001 | Campinos | H04N 7/163 235/380 |
| 6,272,610 B1 | 8/2001 | Katayama et al. | |
| 6,275,436 B1 | 8/2001 | Tobita et al. | |
| 6,279,069 B1 | 8/2001 | Robinson et al. | |
| 6,279,114 B1 | 8/2001 | Toombs et al. | |
| 6,285,607 B1 | 9/2001 | Sinclair | |
| 6,327,639 B1 | 12/2001 | Asnaashari | |
| 6,339,828 B1 * | 1/2002 | Grawrock | G06F 21/31 380/281 |
| 6,345,367 B1 | 2/2002 | Sinclair | |
| 6,374,337 B1 | 4/2002 | Estakhri | |
| 6,393,513 B2 | 5/2002 | Estakhri et al. | |
| 6,397,314 B1 | 5/2002 | Estakhri et al. | |
| 6,411,546 B1 | 6/2002 | Estakhri et al. | |
| 6,467,021 B1 | 10/2002 | Sinclair | |
| 6,490,649 B2 | 12/2002 | Sinclair | |
| 6,529,992 B1 | 3/2003 | Thomas et al. | |
| 6,542,979 B1 * | 4/2003 | Eckardt | G06F 3/0601 711/173 |
| 6,567,307 B1 | 5/2003 | Estakhri | |
| 6,578,127 B1 | 6/2003 | Sinclair | |
| 6,587,382 B1 | 7/2003 | Estakhri et al. | |
| 6,691,213 B1 | 2/2004 | Luu et al. | |
| 6,711,059 B2 | 3/2004 | Sinclair et al. | |
| 6,725,321 B1 | 4/2004 | Sinclair et al. | |
| 6,728,851 B1 | 4/2004 | Estakhri et al. | |
| 6,751,155 B2 | 6/2004 | Gorobets | |
| 6,754,825 B1 | 6/2004 | Lennie et al. | |
| 6,757,800 B1 | 6/2004 | Estakhri et al. | |
| 6,813,678 B1 | 11/2004 | Sinclair et al. | |
| 6,898,662 B2 | 5/2005 | Gorobets | |
| 6,912,618 B2 | 6/2005 | Estakhri et al. | |
| 6,950,918 B1 | 9/2005 | Estakhri | |
| 6,957,295 B1 | 10/2005 | Estakhri | |
| 6,973,519 B1 | 12/2005 | Estakhri et al. | |
| 6,978,342 B1 | 12/2005 | Estakhri et al. | |
| 6,985,583 B1 * | 1/2006 | Brainard | G06F 21/31 380/277 |
| 7,000,064 B2 | 2/2006 | Payne et al. | |
| 7,200,868 B2 * | 4/2007 | Mattox | H04N 7/163 348/E7.056 |
| 7,278,016 B1 * | 10/2007 | Detrick | G06F 21/602 380/44 |

(56) References Cited

U.S. PATENT DOCUMENTS

| | | | |
|---|---|---|---|
| 7,353,536 B1* | 4/2008 | Morris | G06F 21/31 709/203 |
| 7,508,941 B1* | 3/2009 | O'Toole, Jr. | G08B 13/19671 380/228 |
| 8,694,800 B2* | 4/2014 | Ziv | G06F 12/1466 713/189 |
| 2003/0033471 A1 | 2/2003 | Lin et al. | |
| 2003/0046593 A1* | 3/2003 | Xie | G06F 21/80 726/33 |
| 2003/0103603 A1* | 6/2003 | Kurita | G06Q 10/10 379/67.1 |
| 2003/0182546 A1 | 9/2003 | Suzuki et al. | |
| 2004/0010671 A1 | 1/2004 | Sampsa et al. | |
| 2004/0066274 A1* | 4/2004 | Bailey | G06F 21/34 340/5.3 |
| 2004/0068631 A1 | 4/2004 | Ukeda et al. | |
| 2004/0091114 A1* | 5/2004 | Carter | G06F 21/606 380/259 |
| 2004/0103288 A1 | 5/2004 | Ziv et al. | |
| 2004/0193564 A1 | 9/2004 | Ban et al. | |
| 2004/0228487 A1 | 11/2004 | Maeda et al. | |
| 2004/0268135 A1* | 12/2004 | Zimmer | G06F 21/575 713/189 |
| 2005/0015540 A1 | 1/2005 | Tsai et al. | |
| 2005/0021919 A1 | 1/2005 | Kroening | |
| 2005/0027976 A1* | 2/2005 | Stephan | G06F 9/4406 713/1 |
| 2005/0050322 A1* | 3/2005 | Mizrah | H04L 9/0822 713/168 |
| 2005/0182860 A1* | 8/2005 | Schneckenburger | G06F 13/385 710/8 |
| 2005/0188199 A1* | 8/2005 | Smith | G06F 21/606 713/165 |
| 2006/0190726 A1* | 8/2006 | Brique | G06F 21/445 713/168 |
| 2006/0236409 A1 | 10/2006 | Kuehnel et al. | |
| 2007/0067625 A1* | 3/2007 | Jiang | H04L 63/10 713/168 |
| 2007/0169174 A1* | 7/2007 | Critten | G06F 21/34 726/3 |
| 2008/0072040 A1* | 3/2008 | Asano | G11B 20/00086 713/158 |
| 2008/0263361 A1* | 10/2008 | Dutta | H04L 9/0891 713/182 |
| 2010/0239087 A1* | 9/2010 | Chaisson | G06F 21/46 380/44 |

FOREIGN PATENT DOCUMENTS

| | | |
|---|---|---|
| EP | 0 243 503 A1 | 11/1987 |
| EP | 0 392 895 A2 | 10/1990 |
| EP | 0 424 191 A2 | 4/1991 |
| EP | 0 489 204 A1 | 6/1992 |
| EP | 0 522 780 A2 | 1/1993 |
| EP | 0 522 780 B1 | 1/1993 |
| EP | 0 544 252 A2 | 6/1993 |
| EP | 0 613 151 A2 | 8/1994 |
| EP | 0 617 363 A2 | 9/1994 |
| EP | 0 619 541 A2 | 10/1994 |
| EP | 0 663 636 A1 | 7/1995 |
| EP | 0 897 579 B1 | 7/2000 |
| EP | 0 891 580 B1 | 11/2000 |
| EP | 0 896 669 B1 | 11/2000 |
| EP | 0 852 766 B1 | 5/2001 |
| EP | 0 852 765 B1 | 9/2001 |
| EP | 0 722 585 B1 | 5/2002 |
| EP | 0 910 826 B1 | 6/2002 |
| EP | 0 691 008 B1 | 11/2002 |
| EP | 0 861 468 B1 | 4/2003 |
| EP | 0 978 040 B1 | 5/2004 |
| EP | 1 157 328 B1 | 5/2005 |
| GB | 2 251 323 | 7/1992 |
| GB | 2 291 990 | 2/1996 |
| GB | 2 291 991 | 2/1996 |
| GB | 2 297 637 | 7/1996 |
| GB | 2 304 428 | 3/1997 |
| GB | 2 348 991 | 12/2002 |
| GB | 2 351 822 | 1/2003 |
| GB | 2 384 337 | 7/2003 |
| GB | 2 384 883 | 10/2005 |
| GB | 2 384 338 | 11/2005 |
| GB | 2 384 072 | 12/2005 |
| GB | 2 411 499 | 2/2006 |
| IS | 117881 | 5/2003 |
| JP | 59-45695 A | 9/1982 |
| JP | 58-215794 A | 12/1983 |
| JP | 58-215795 A | 12/1983 |
| JP | 59-162695 A | 9/1984 |
| JP | 60-212900 | 10/1985 |
| JP | 61-96598 A | 5/1986 |
| JP | 62-283496 A | 12/1987 |
| JP | 62-283497 A | 12/1987 |
| JP | 63-183700 A | 7/1988 |
| JP | 1-138694 | 5/1989 |
| JP | 3-228377 | 10/1991 |
| JP | 4-57295 | 2/1992 |
| JP | 4-254994 | 9/1992 |
| JP | 4-268284 | 9/1992 |
| JP | 4-278297 | 10/1992 |
| JP | 4-332999 A | 11/1992 |
| JP | 5-128877 | 5/1993 |
| JP | 5-282883 | 10/1993 |
| JP | 6-36578 | 2/1994 |
| JP | 6-124175 | 5/1994 |
| JP | 6-124231 | 5/1994 |
| JP | 6-132747 | 5/1994 |
| JP | 6-149395 | 5/1994 |
| JP | 6-131889 | 6/1994 |
| JP | 6-266596 | 9/1994 |
| JP | 7-93499 | 4/1995 |
| JP | 7-311708 | 11/1995 |
| JP | 8-18018 | 1/1996 |
| JP | 8-69696 | 3/1996 |
| JP | 9-147581 | 6/1997 |
| SU | 1388877 | 4/1988 |
| SU | 1408439 | 7/1988 |
| SU | 1515164 | 10/1989 |
| SU | 1541619 | 2/1990 |
| SU | 1573458 | 6/1990 |
| SU | 1686449 | 10/1991 |
| WO | WO 84/00628 | 2/1984 |
| WO | WO 94/20906 | 9/1994 |

OTHER PUBLICATIONS

Walter Lahti and Dean McCarron, "State of the Art: Magnetic VS Optical Store Data in a Flash", *Byte Magazine*, Nov. 1, 1990. 311, vol. 15, No. 12.

Ron Wilson, Technology Updates, Integrated Circuits, "I-Mbit flash memories seek their role in system design", *Computer Design* 28 (1989) Mar. 1, No. 5, Tulsa OK, US, pp. 30 and 32.

S. Mehoura et al., SunDisk Corporation, Santa Clara, CA. R.W. Gregor et al., AT&T Bell Laboratories, Allentown, PA. 1992 Symposium of VLSJ Circuits Digest of Technical Papers, "EEPROM for Solid State Disk Applications", pp. 24 and 25.

Mendel Rosenblum and John K. Ousterhout, "The Design and Implementation of a Log-Structured File System," 1991, 15 pgs., Berkeley, USA.

Brian Dipert and Markus Levy, *Designing with Flash Memory*, Annabooks, Apr. 1994, 445 pgs.

Science Forum, Inc. "Flash Memory Symposium '95", 1995, 13 pgs. Tokyo.

Ross S. Finlayson and David R. Cheriton, "An Extended File Service Exploiting Write-Once Storage," *ACM Symposium on Operating Systems Principles*, 1987, 10 pgs.

Jason Gait, "The Optical File Cabinet: A Random-Access File System for Write-Once Storage", *Computer*, Jun. 1988, 12 pgs.

Henry G. Baker, *Memory Management*, 1995, Springer-Verlag Heidelberg, Germany, 19 pgs.

(56) References Cited

OTHER PUBLICATIONS

Sape J. Mullender and Andrew S. Tanenbaum, "A Distributed File Service Based on Optimistic Concurrency Control", *ACM Press*, 1985, 12 pgs. New York, New York.

Hiroshi Nakamura, Junichi Miyamoto, Kenichi Imamiya and Yoshihisa Iwata, "A Novel Sense Amplifier for Flexible Voltage Operation NAND Flash Memories", VLSI Circuits, 1995, *Digest of Technical Papers*, 2 pgs.

Hiroshi Nakamura, Junichi Miyamoto, Kenichi Imamiya, Yoshihisa Iwata and Hideko Oodaira, "A Novel Sensing Scheme with On-Chip Page Copy for Flexible Voltage NAND Flash Memories", *IEICE Transactions on Electronics*, vol. E79-C, No. 6, pp. 836-844.

Takaaki Nozaki, Toshiaki Tanaka, Yoshiro Kijiya, Eita Kinoshita, Tatsuo Tsuchiya and Yutaka Hayashi, "A 1-Mb EEPROM with MONOS Memory Cell for Semiconductor Disk Application", *Journal of Solid-State Circuits*, vol. 26, No. 4, 5 pgs.

Kai Hwang and Faye A. Briggs, *Computer Architecture and Parallel Processing*, 1984, McGraw-Hill, Inc.

Ron Wilson, "Integrated Circuits; 1-Mb flash memories seek their role in system design", Mar. 1, 1989, 2 pgs. Tulsa, OK.

S. Mehroura, J.H. Yuan, R.A. Cemea, W.Y. Chien, D.C. Guteman, G. Samachisa, R.D. Norman, M. Mofidi, W. Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, "Serial 9Mb F EEPROM for Solid State Disk Applications", symposium, 2 pgs., 1992, Mountain View, CA.

Steven H. Leibson, "Nonvolatile, In-Circuit-Reprogrammable Memories", *EDN Special Report*, Jan. 3, 1991, No. 12, 12 pgs.

Walter Lahti and Dean McCarron, "State of the Art: Magnetic vs. Optical Store Data in a Flash", *Byte Magazine*, 1990, vol. 15, No. 12, 7 pgs.

Ramon Caceres, Fred Douglis, Kai Li and Brian Marsh, "Operating System Implications of Solid-State Mobile Computers", *Workshop on Workstation Operating Systems*, Oct. 1993, pp. 21-27.

Michael Wu and Wily Zwaenepoel, "A Non-Volatile, Main Memory Storage System", *ACM Press*, 1994, 12 pgs., San Jose, CA.

Dave Bursky, "Innovative flash memories match DRAM densities: available with a choice of features, flash memories are finding homes in many systems (including related articles on the origins of flash, and on the differences between NAND and NOR flash memories)", *Electronic Design*, May 16, 1994, vol. 42, No. 10, 9 pgs.

Anthony Cataldo, "New flash enhancements up ante. (Intel's 28F400BV-120 and 28F004BV-120, Atmel's AT29BV010 and AT29BV020, and Samsung Semiconductor's KM29V3200 flash memory devices)" (product announcement), *Electronic News*, Mar. 13, 1995, vol. 41, No. 2056, 4 pgs.

Sam Weber, "Flash modules' portability, reusability, small size valued for a host of APPs-Consumer formats flocking to flash", *Electronic Engineering Times*, Jul. 22, 1996, No. 911, 9 pgs.

Stan Baker, "But Integration Calls for Hardware, Software Changes: Flash designers face the dawn of a new memory age", *Electronic Engineering Times*, Dec. 3, 1990, vol. 41, No. 619, 5 pgs.

Toshiba, MOS Memory (Non-Volatile), 1995, Data Book.

Toshiba, Toshiba MOS Digital in Legrated Circuit Silicon Gate CMOS, (TC58NS512DC), Mar. 21, 2001, 43 pgs., Data Book.

Toshiba, Toshiba Corporation, SMIL (Smartmedia Interface Library) Hardware Edition Version 1.00, Jul. 1, 2000, 136 pgs., Data Book.

Toshiba, Toshiba MOS Digital in Legrated Circuit Silicon Gate, (TC58512FT), Mar. 5, 2001, 43 pgs., Data Book.

Toshiba, Toshiba MOS Digital Integrated Circuit Silicon Gate, (TC58DVM92A1FT00), Jan. 10, 2003, 44 pgs., Data Book.

Toshiba, Toshiba MOS Digital Initegraded Circuit Silicon Gate, (TC58DVG02A1FT00), Jan. 10, 2003, 44 pgs., Data Book.

Toshiba, Toshiba MOS Digital integrated Circuit Silicon Gate, (TC58100FT), Mar. 5, 2001, 43 pgs., Data Book.

Toshiba, MOS Memory (Non-Volatile), 1996, 279 pgs., Data Book.

"Fifth Biennial Nonvolatile Memory Technology Review," 1993 Conference, Jun. 22-24, 1993, Linthicum Heights, MD, USA.

Dan Auclair, "Optimal Solid State Disk Architecture for Portable Computers", Silicon Valley PC Design Conference, Jul. 9-10, 1991, pp. 811-815.

\* cited by examiner

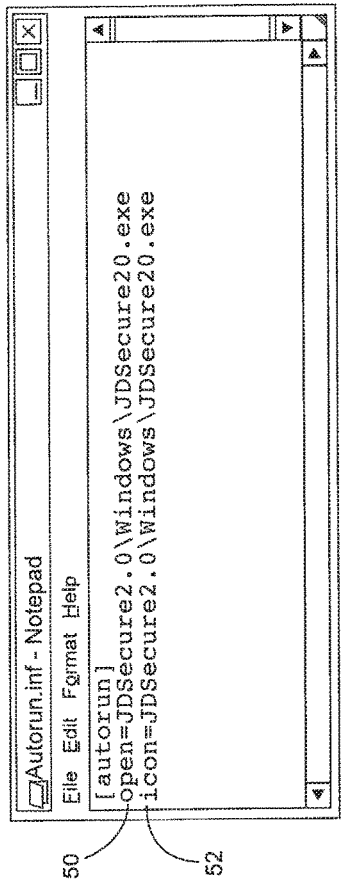

METHODS OF OPERATING STORAGE SYSTEMS INCLUDING ENCRYPTING A KEY SALT

RELATED APPLICATIONS

This application is a divisional of U.S. patent application Ser. No. 14/081,124, filed Nov. 15, 2013 and issued as U.S. Pat. No. 9,576,154 on Feb. 21, 2017, which is a divisional of U.S. patent application Ser. No. 13/419,964, filed Mar. 14, 2012 and issued as U.S. Pat. No. 8,612,671 on Dec. 17, 2013, which is a divisional of U.S. patent application Ser. No. 12/968,512, filed Dec. 15, 2010 and issued as U.S. Pat. No. 8,151,041 on Apr. 3, 2012, which is a continuation of U.S. patent application Ser. No. 12/115,170, filed May 5, 2008 and issued as U.S. Pat. No. 7,865,659 on Jan. 4, 2011, which is a continuation of U.S. patent application Ser. No. 11/118,959, filed Apr. 29, 2005 and issued as U.S. Pat. No. 7,370,166 on May 6, 2008, which application claims priority to U.S. Provisional Application No. 60/567,132, filed on Apr. 30, 2004, all of which applications incorporated herein by reference in their entirety.

FIELD

The present invention relates generally to devices and particularly to removable devices.

BACKGROUND

As part of increased security measures, digital storage devices, such as those used with Personal Computers (PC) and otherwise, rightfully deserve their fair share of additional security, particularly when used in an Internet environment.

That is, files saves for all sorts of usage, such as photography, passwords, data in general, at times, need to be securely handled without any threat of invasion, manipulation or simply theft. Currently, digital storage devices, such as a Jumpdrive made by Lexar Media, Inc. of Fremont, Calif., does not include safety measure features to avoid wrongful manipulation of data stored therein. The important reason for implementing security on a secure removable storage device is that such devices are prone to getting lost because they are small and portable.

Thus, the need arises for a secure removable storage device for storing data or information in a safe and secure manner thereby avoiding wrongful manipulation or deletion of the stored data while allowing further secure application of the removable storage device in the environment of the Internet.

There is an additional need to personalize the storage device so that user-selected or program settings are automatically executed regardless of which host the storage device is connected thereto.

BRIEF DESCRIPTION OF THE DRAWINGS

FIG. 3 shows an example of the contents of the 'autorun.inf' file in accordance with an embodiment of the present invention;

FIG. 4 illustrates an example of a response from the device 12 to the host 24;

DETAILED DESCRIPTION

Figure 1:
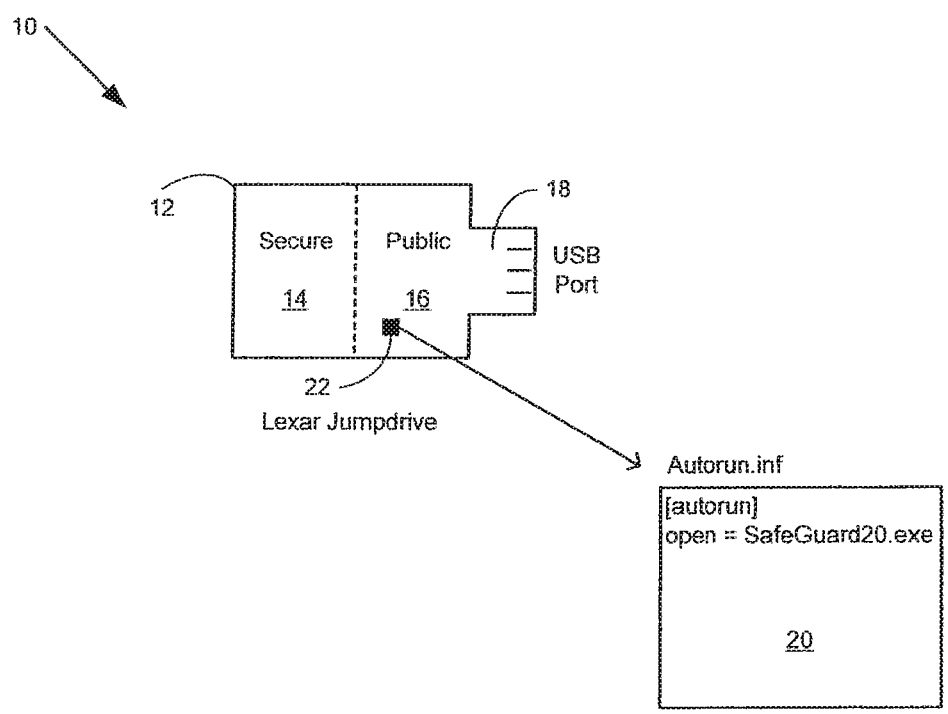
FIG. 1 shows a secure storage system 10 in accordance with an embodiment of the present invention.

Referring now to FIG. 1, a secure storage system 10 is shown to include a removable (or portable) storage device 12 having two partitioned storage areas, a secure storage area 14 and a public storage area 16, and a device port 18, in accordance with an embodiment of the present invention. The port 18 couples the device 12 to a host (not shown in FIG. 1) and in one embodiment of the present invention is a Universal Serial Bus (USB) connector although other types of connectors may be employed without departing from the scope and spirit of the present invention. In one embodiment of the present invention, the device 12 is a removable (or portable) flash storage device or a removable nonvolatile storage device.

Also shown in FIG. 1, is a display 20 appearing on a monitor of a host (not shown) for displaying the contents of an 'autorun.inf' file, which is a file used by Microsoft operating systems, such as Windows, for automatically executing files that are indicated as being automatically executed, by the operating systems, at start-up. For example, in FIG. 1, the file that is being indicated to automatically start at, start-up, is the file 'SafeGuard 20.exe' and it will be executed automatically when the device 12 is connected, through the port 18, to a host. It should be noted that the file 'SDSSecure20.exe' merely serves as an example, other files may be indicated and are actually specified by a user of the device 12.

In one embodiment of the present invention, the device 12 includes flash or nonvolatile memory and particularly in the secure area 14 and the public area 16.

While the 'autorun.inf' file is known to Windows operating systems, the concept of executing, automatically, files listed in the 'autorun.inf' for removable devices is not known. That is, in prior art systems, Microsoft operating systems do not support the 'autorun' feature for devices that are removably connected to a host.

The way in which the 'autorun' feature supports the device 12 is by making the device 12 appear as a 'non-removable' device rather than a 'removable' device to the operating system. This entails changing the firmware that resides or is stored within the device 12 so that it returns the properties of the device 12 as that of a 'non-removable' device. Particularly, upon a Small Computer Systems Interface (SCSI) inquiry from a host, a response thereto, from the device 12, indicates that the latter is 'non-removable'.

A further change is to create an 'autorun.inf' file in a root directory, or at 22 in FIG. 1, of the device 12, specifying the name of the program to be executed automatically, which in the example of FIG. 1 is the program 'SafeGuard20.exe'.

Figure 2:
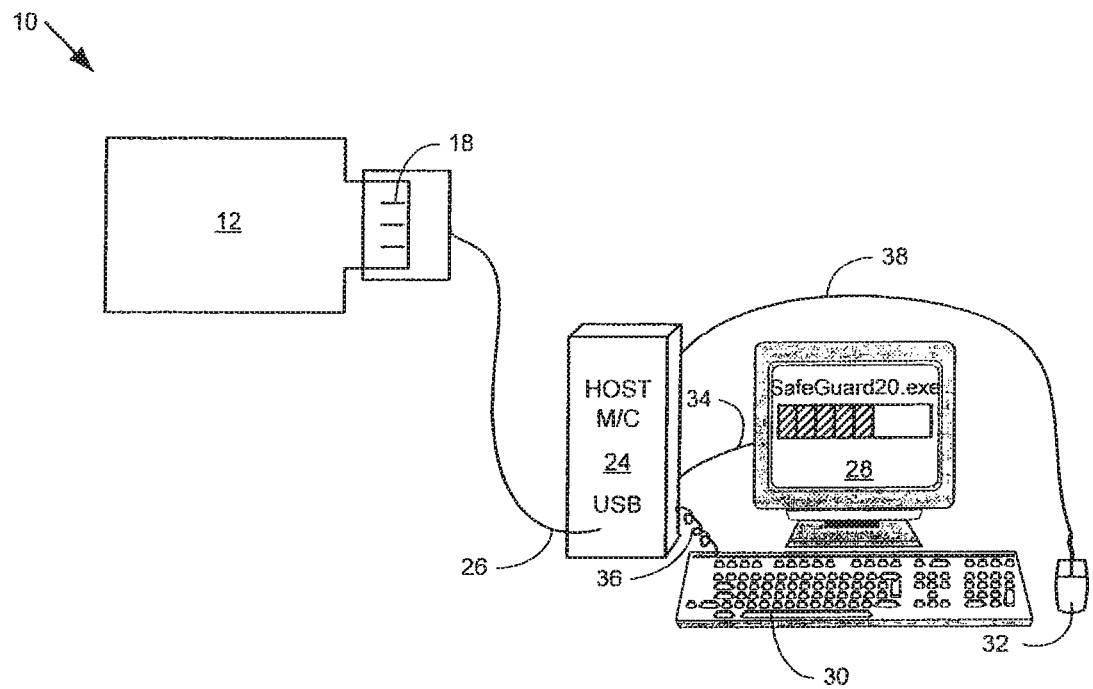
FIG. 2 shows further aspects of the system 10 of FIG. 1.

FIG. 2 shows further aspects of the system 10, particularly, a host 24 including a host port 26 through which the host 24 is coupled to the device 12. That is, the port 26 is connected to the port 18 for causing communication between the host 24 and the device 12. In one embodiment of the present invention, the port 26 is a USB connector but other types of connectors may be readily employed.

The host 24 is shown to be coupled to a monitor 28 through the connection 34 and to a mouse device 32 through the connection 38 and to a keyboard device 30 through the connection 36. Following the example of FIG. 1, the 'SafeGuard20.exe' software is opened and displayed on the monitor 28 in FIG. 2. It should be noted that the 'SafeGuard20.exe' software was automatically started when the device 12 was plugged into the host 24 through the ports 18 and 26 because such an automatic action is effectuated through the 'autorun.inf' program, as discussed above.

Another example of the contents of the 'autorun.inf' program is presented in FIG. 3 in accordance with an embodiment of the present invention. In FIG. 3, the program that is slated for automatic execution thereof upon a removable storage device being coupled to a host is 'JDSecure20.exe' and in fact, an icon representing this program will also appear on a monitor displayed to the user, as the same is programmed into the 'autorun.inf' file. In operation, the user chooses to have or have not an icon respresent the program to be automatically opened upon start-up and the storage device then adds this feature to the user's start-up procedure by programming the 'autorun.inf' file as shown in FIG. 3.

When a user connects a removable storage device, such as the device 12, to a host, such as the host 24 of FIG. 2, the operating system, such as Windows, being executed by the host 24, discovers that the device 12 supports 'autorun' because the device 12 includes an 'autorun.inf' file and it is being represented as a non-removable device to the host 24. Windows then invokes the program listed in the autorun.inf file under the "open" section, at 50 in FIG. 3 and creates an icon representing the listed program, as the same is indicated under the "icon" section, at 52 in FIG. 3, of the 'autorun.inf' file.

This relieves the user from determining which program to execute and at the same time, a setup program is automatically invoked.

FIG. 4 shows an example of a response from the device 12 to host 24 (in FIG. 2). In particular, as the device 12 falsely leads the host 24 to believe that it is non-removable, at 54 in FIG. 4, the removable data is indicated as being '0', thus, to the host 24, the device 12 is non-removable.

Figure 5:
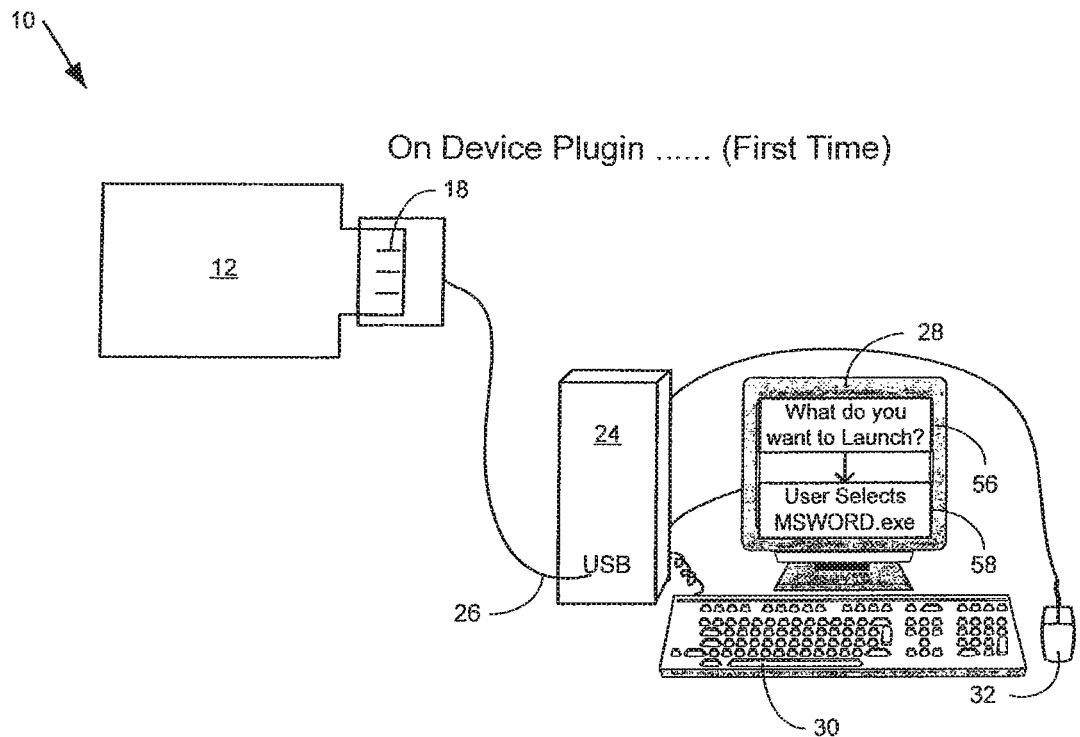
FIG. 5 shows the system 10 including the structures of FIG. 2 except that the monitor 28 is shown to display, at 56, a question posed to the user as to what application the user would like to launch and next, at 58.

FIG. 5 shows the system 10 including the structures of FIG. 2 except that the monitor 28 is shown to display, at 56, a question posed to the user as to what application the user would like to launch and next, at 58, the user (not shown) selects the application he/she would like to have launched automatically upon start-up, or when the device 12 is coupled to the host 24. In this example, the user has chosen to launch MS Word, a word processing application, manufactured by Microsoft, Inc. of Seattle, Wash.

In operation, the first time a user connects the device 12 to the host 24, the user is asked to select an application to be executed automatically, at 56. The application that the user wishes to select can reside either in the host 24 or in the device 12.

Figure 6:
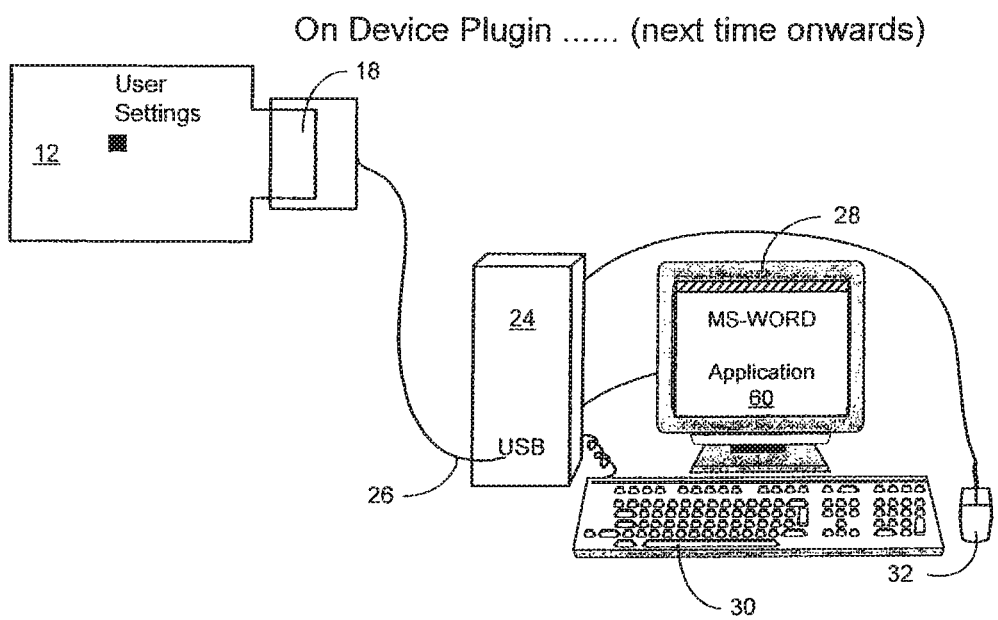
FIG. 6 shows the system 10 but when the user connects the device 12 to the host 24, the software program that was listed in the autorun.inf file as being 'autorun' causes the user-selected application to be executed.

In FIG. 6, the system 10 is shown again but this time, when the user connects the device 12 to the host 24, the software program that was listed in the autorun.inf file as being 'autorun' causes the user-selected application to be executed, i.e. MS Word in the example of FIGS. 5 and 6. In fact, once the user goes through the process of FIG. 5, every time the user connects the device 12 to the host 24, the software program which was designated in the 'autorun.inf' file, under "open", will be executed automatically. Again, in this example, MS Word will be automatically executed very time the user plugs the device 12 into the host 24 because MS Word will have been designated under 'open' in the 'autorun.inf' file after the user selected MS Word at 58 in FIG. 5.

The device 126 remembers the name and the location of the user-selected application, i.e. MS Word. Thus, if the user plugs the device 12 into a second host or a host other than the host 24, the user-selected application is launched onto the second host. The user-selectable application could reside on the device 12 or the host.

As an example, the application Word will most likely reside on the host. The device 12 only remembers the "location" or "path" of the program to be executed on a device plug-in. If the location of Word is the same for a host1 and a host2 (which is normally true, unless user installed the WORD application at a specific location), then Word will run automatically on host1 and host2. If the user-selectable program resides on the device 12, it will execute in any case.

Figure 7:
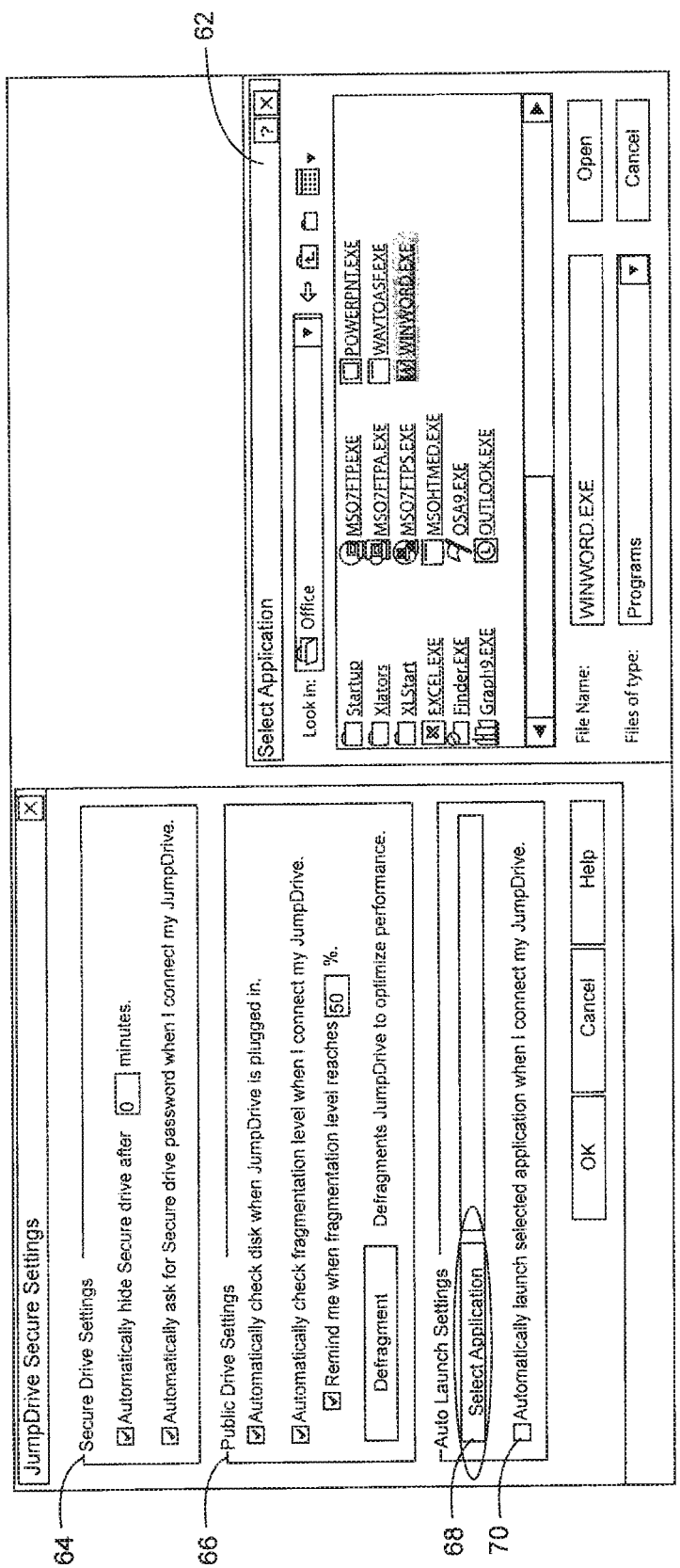
FIG. 7 shows the way in which a user selects the user-selected application.

FIG. 7 shows the way in which a user selects the user-selected application or MS Word in this example (in FIG. 7, the selected application is highlighted as being 'WINWORD.EXE', however, for all intents and purposes, this is the same as MS Word).

In FIG. 7, the user, at 64, may choose to change settings that correspond to the secure area 14 (in FIG. 1) and/or the settings associated with the public area 16 (in FIG. 1) and at 68, the user selects which application to launch. In this case, since the user has selected the MS Word application, at 62, WINWORD.EXE is highlighted. At 70, the user is provided with the option of choosing whether or not to automatically launch the selected application when the device 12 is connected to the host 24.

Figure 8:
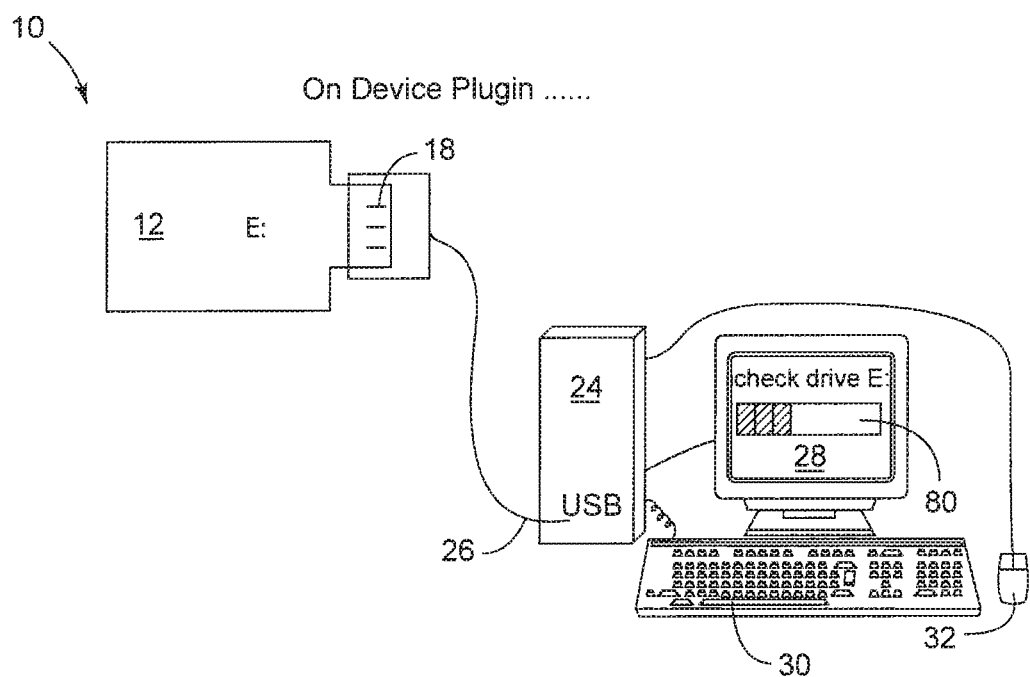
FIG. 8 shows the system 10 for automatically checking the health of the device 12 when it is plugged into or connected to the host 24.

FIG. 8 shows the system 10 for automatically checking the health of the device 12 when it is plugged into or connected to the host 24. It should be noted that generally, devices, such as the device 12 have a file system identifying the location of system files and other types of file-related information. In FIG. 8, the drive 12 is treated as drive 'E' (or 'E:' as often used to denote a particular drive) from the perspective of the host 24. Thus, the monitor 28 displays, to the user, checking of the drive E: at 80 and as each sector of the drive E: is checked, it is highlighted as shown at 80. A sector is a group of bytes in a storage device for storing user data and overhead data, the user data being generic data or information and the overhead data being information regarding the user data, such as location, error correction and other types of information. Checking sectors may include only the checking of user data and/or the checking of user data and overhead data.

Figure 9:
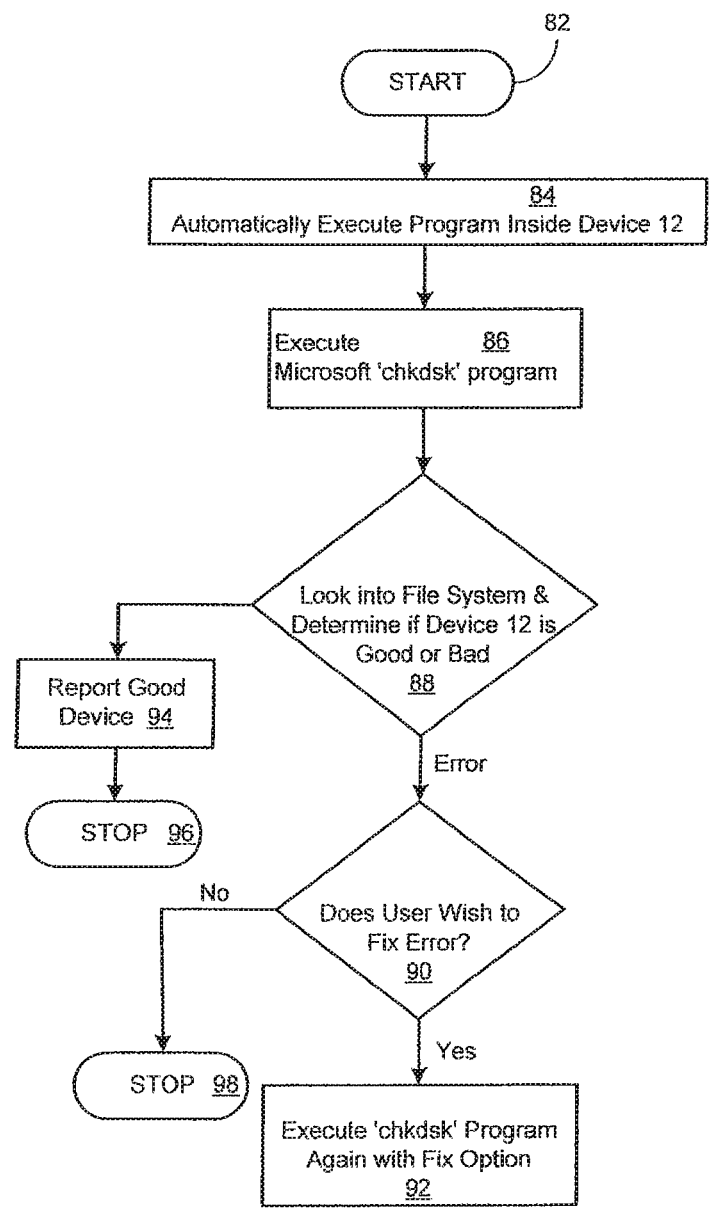
FIG. 9 shows a flow chart of the steps performed for checking the health of a storage device, such as the device 12.

FIG. 9 shows a flow chart of the steps performed for checking the health of a storage device, such as the device 12. The program that performs these steps generally resides in the host. Using the 'autorun.inf' program, the program that performs these steps, 'JDsecure' is transferred from the device 12 to the host when the device 12 is initially connected to the host.

Every time the user plugs the device 12 into the host 24, execution of the software program, launched from the 'autorun.inf' file, causes checking of the device file system for integrity, which is done with the help of a Microsoft-provided program called 'chkdsk'.

If the chkdsk program finds errors on the device file system, the user is informed of the error(s) and asked, by the system 10, for acknowledgement to fix the errors.

If the device 12 does not have a file system, i.e. it is a 'raw' device, the user is asked as to whether he/she would like to format (create a file system) on the device 12. This is all done by execution of the software program that is launched from the 'autorun.inf' file.

FIG. 9 illustrates a flow chart of the steps performed for checking the health of a portable (or removable) storage device, such as the device 12, when the latter is coupled to a host.

In FIG. 9, the process starts at 82 and continues to step 84 of automatically executing a software program residing within the device 12, which is caused to be executed from and due to the 'autorun.inf' file, as previously discussed. Next, at step 86, the Microsoft software program, 'chkdsk' is executed to check the integrity of device 12. This is actually a check of the storage locations within the device 12. That is, as earlier noted, the device 12 may include flash or nonvolatile memory, which include storage locations, generally grouped in sectors, each sector for storing sector information or sector data including user data and perhaps overhead data, and a group of sectors defining a block. Execution of the 'chkdsk' program verifies the integrity of the storage locations of the device 12.

Next, at 88, a determination is made as to whether or not the device 12 is 'good' or 'bad', i.e. its storage locations are capable of properly storing information or not. ChkDsk program verifies the file system integrity by validating the entries of File Allocation Table (FAT). Specifically "all" the entries of the File Allocation Table.

If the device 12 is determined not be healthy or 'good' and is 'bad', an error is returned by the 'chkdsk' program and the user is informed at step 90 and then asked whether or not the user wishes to attempt to fix errors on the device 12. If the user responds in the positive, or would like to attempt to fix errors, the process continues to step 92 at which time the 'chkdsk' program is re-executed with a fix option to try to fix the errors of the device 12.

If at 88 no errors are noted, the 'chkdsk' program causes a report to be generated to the user informing the latter that the device 12 is healthy or 'good', at step 94, and the process slops at 96.

If, at 90, the user decides not to fix the errors, the process stops at 98.

While not depicted in FIG. 9 and as earlier noted, if the device 12 does not have a file system and is 'raw', execution of the software program residing in the 'autorun.inf' file causes the user to be asked whether he/she would like to format the device 12. This, in effect, creates a file system assigning sectors and creating a map of the storage locations of the device 12. If so, the device 12 is formatted and then the process of FIG. 9 can effectively take place.

Figure 10:
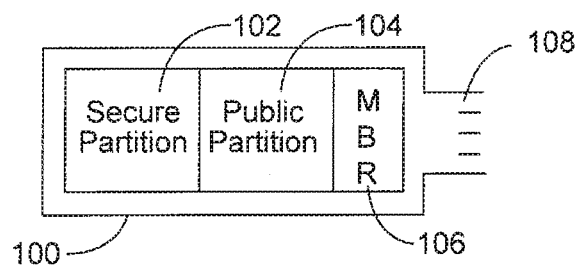
FIG. 10 shows a storage device 100, in accordance with another embodiment of the present invention.

In accordance with another embodiment of the present invention, FIG. 10 shows a storage device 100, in accordance with another embodiment of the present invention, which is a flash storage device in one embodiment of the present invention and in other embodiments may be non-volatile or other storage types. The device 100 is shown to include three locations, a secure partition 102, a public partition 104 and a master boot record 106. The partitions 102 and 104 are similar to the areas 14 and 16, respectively, of FIG. 1. In fact, the term 'partition' is used synonymously with the term 'area'.

In the embodiment of the FIG. 10, the secure partition 102 is intended to be hidden and not accessed or read by the operating system of the host. This allows any data stored within the secure partition 102 to remain secure without intervention by users or remotely in an Internet environment. The only way to access or read the information in the secure partition 102 is by use of vendor unique commands that are only known to the manufacturer of the device 102, such as Lexar Media, Inc., and perhaps a vendor purchasing the device 100.

The device 100 also includes a port 108 for coupling the device 100 to a host. In one embodiment of the present invention, the port 108 is a USB port although other types of interfaces may be used without departing from the scope and spirit of the present invention.

Another security measure is to have any data written to or programmed within the secure partition 102 to be encrypted prior to being stored therein. In fact, in operation, when a user wishes to store information within the device 102 that is intended to be secure, i.e. stored within the secure partition 102, through the use of a host, as the user types the information, the information is encrypted, in real-time, and then stored in the secure partition 102.

As previously indicated, the device 100 is known to the operating system, such as a Windows Operating System, as a non-removable device and it is for this reason that the device 100 may be partitioned.

Currently, prior art system partition a device but only by way of software. That is, a software program partitions memory or storage locations and then keeps track of the partitions throughout the use of the storage device. The drawback to such prior art systems is that once the storage device is formatted or re-formatted, the partition is lost and the device once again appears as non-partitioned until partitioned again by software. Another drawback is that the information kept within all partitions is lost during formatting, thus, no data or information is actually stored truly securely.

The embodiment of FIG. 10 allows for information stored within the secure partition 102 to be maintained even during and after formatting or re-formatting of the device 100. Indeed, the only way to destroy the information stored within the secure partition 102 is by destroying the device 100.

The device 100 is originally shipped to the user with only a public area which contains the JDSecure20.exe program.

The User creates a secure area 102 by using this program and establishes a password for accessing the secure area. A User can re-partition the device 100 by using JDSecure20.exe program. The partitioning of the device is done by JDSecure20.exe program after authenticating the user by way of a password which initially was created by the user.

Information in the secure area can be altered once the user has opened the secure area for use. Such information is encrypted and protected from deletion upon disconnecting the device from the host. It could be unprotected again, for altering data or the size of the secure area only by a known user by way of a password.

The way in which the secure partition 102 is kept hidden to the operating system is by hidden attributes, thus, preventing the operating system from having the capability to assign any drive letters to the partition.

The master boot record 106 maintains a memory map of the assignment or partitioning of the device 100 and maintains information about the number of partitions in the device 100 and the size of the partitions. The master boot record 106 is read-only in order to avoid unauthorized deletion of the secure area. The master boot record 106 is a read-only area, therefore, once the device 100 is partitioned once, the master boot record 106 cannot be written thereto or programmed again, thus, preventing unauthorized deletion of the secure partition 102, and effectively partitioning the device 100 in hardware.

Figure 11:
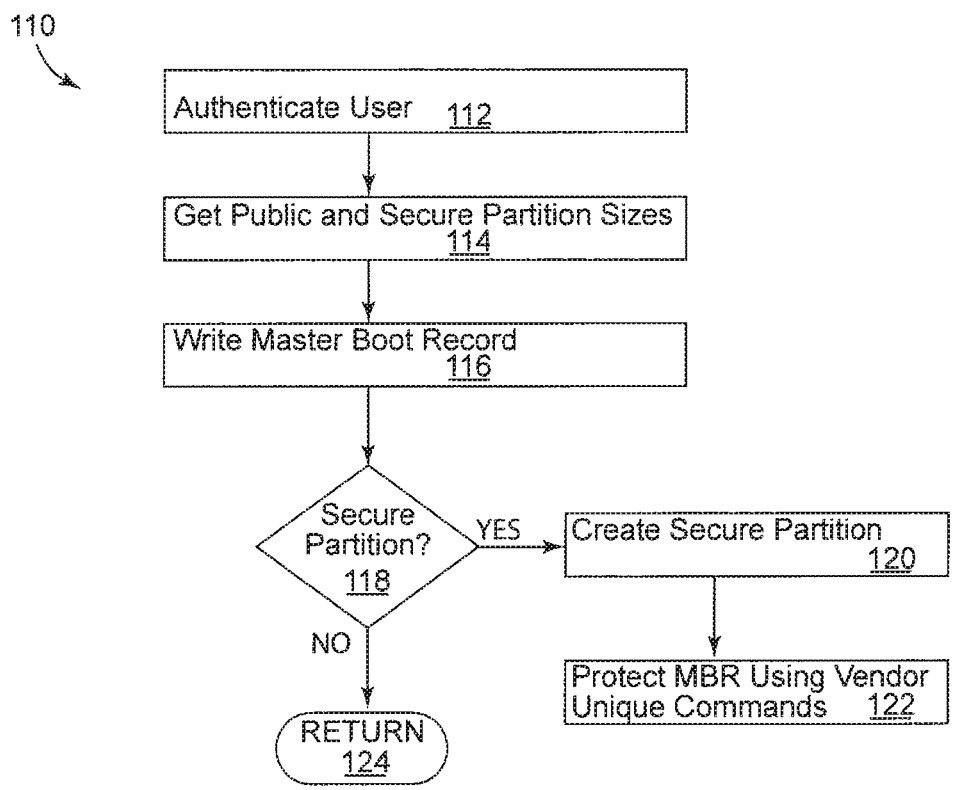
FIG. 11 shows a flow chart 110 listing the steps performed for creating the secure partition 102 of FIG. 10.

FIG. 11 shows a flow chart 110 listing the steps performed for creating the secure partition 102 of FIG. 10. In FIG. 11, at step 112, a user is authenticated. This will be discussed in further detail below but briefly, the user is authenticated either by a fingerprint verification or password verification. Next, at step 114, corresponding sizes of the amount of storage locations allocated to each of the partitions 102 and 104 of FIG. 10 are obtained from the user.

Next, at step 116, the master boot record 106 is written thereto or programmed. Next, at 118, a determination is made as to whether or not a secure partition is desired to be created. In some cases, a user may wish not to have a secure partition because no data is intended to be confidential and the user perhaps wishes to conveniently write, re-write or copy the storage locations of the device without any limitations. In the latter case, no secure partition is created and the process returns at 124 and the storage locations of the device are all partitioned as public and a master boot record exists but need not be read-only because there is no secure area to protect from deletion. Upon creation of a secure partition, the master boot record is changed to reflect this new partition and also made read-only in order to prevent unauthorized deletion of the secure partition.

However, if at 118, it is determined that a secure partition is intended to be created, the process continues to step 120 at which point such a partition is created with a size reflecting the size indicated at step 114. Next, at step 122, the master boot record, which by now, has been programmed using vendor unique commands to include the partitioning information, is protected to be read-only and even then using vendor unique commands only.

If a secure partition is created, it is marked as hidden by Microsoft operating system features and in particular, the attribute 0x16 in the master boot record 106. In this manner, the operating system is prevented from assigning a drive letter to the storage device in which the secure partition resides. The secure partition also becomes 'firmware protected' such that only vendor unique commands can be sent to the secure partition to prevent unauthorized deletion of the partition.

Figure 12:
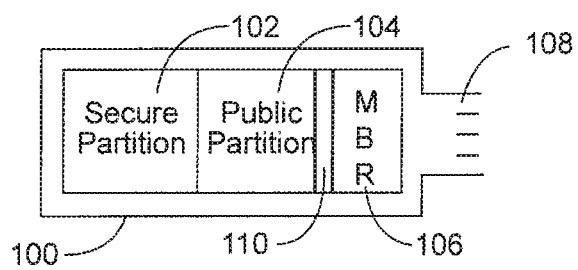
FIG. 12 shows the device 100 with further details of the allocation of the storage locations thereof.

FIG. 12 shows the device 100 with further details of the allocation of the storage locations thereof. A file allocation table (FAT) 110 is shown as a location where locations of various program files are maintained in sector format. For example, to refer to an example provided earlier, the location of the Microsoft program Word is maintained in the FAT 110 so that when this application program is accessed by the user, the FAT 110 is accessed to determine where to access the Word program.

Next, the concept of encryption, in real-time or 'on-the-fly' will be discussed, as referred to briefly earlier. The data or information stored in the secure partition of a storage device may be encrypted 'on-the-fly' so that only the encrypted data is stored within these cure partition and the data, itself, in its raw form or without encryption is not stored anywhere. An example of this is provided with reference to FIG. 13.

Figure 13:
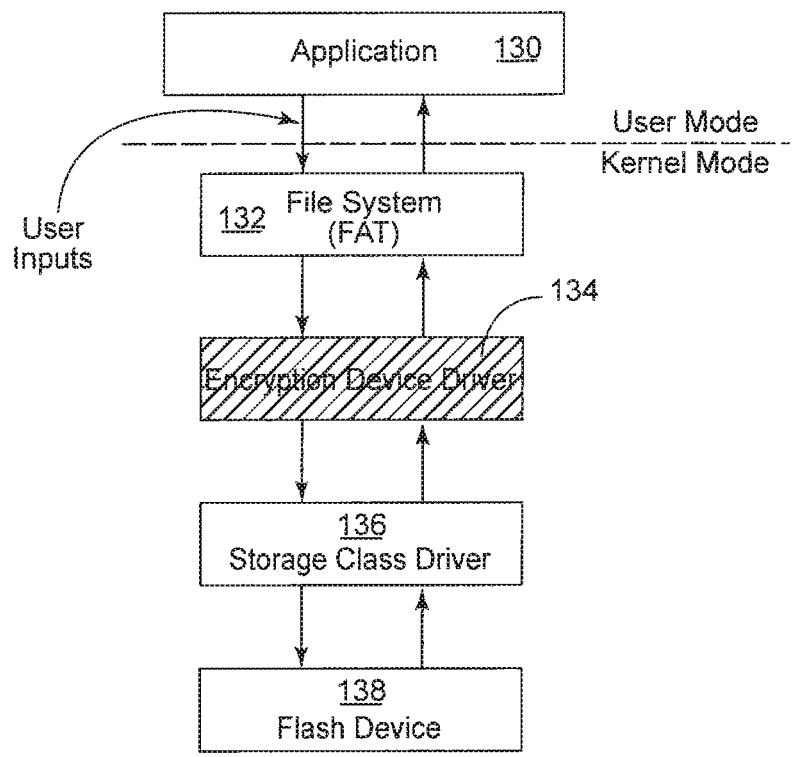
FIG. 13 shows an allocation structure to include an application layer 130, which is in contact with a file system or FAT 132, which is, in turn, in contact with an encryption device driver 134, which is in contact with a storage driver 136, which is in contact with a flash storage device 138.

In FIG. 13, an allocation structure is shown to include an application layer 130, which is in contact with a file system or FAT 132, which is, in turn, in contact with an encryption device driver 134, which is in contact with a storage driver 136, which is in contact with a flash storage device 138. The device 138 is similar to the devices discussed in previous figures, such as the devices 12 and 100.

The application layer 130 includes application programs available to a user, examples of which include the Windows Explorer, Word, Outlook, etc. The application layer 130 is apparent to the user during his/her use, thus, it is designated as being within the user mode, whereas, the remaining structures of FIG. 13 are system structures and not necessarily apparent to the user. The programs execute at a higher privilege level and access computer resources which are normally not available to user programs or applications.

Again referring to a previous example, assuming that the application being used is Word and thus included in the application layer 130, the input or information provided by the user, through the use of a keyboard or otherwise, is encrypted as soon as it is recognized as having been input by the system. The encryption is performed by the device driver 134.

The FAT 132 identifies the location of the Word program and the device driver 134 encrypts the information input by the user. A 'driver', as used herein, is generally a program that facilitates communication between hardware and software, i.e. it enables a particular software program to communicate to a particular hardware device.

The information encrypted by the driver 134 is communicated to yet another driver, namely the storage driver 136 (sometimes referred to as mass storage driver), which ultimately causes storage of the encrypted information within the device 138 and particularly within the secure partition of the device 138. In this manner, the data or information input by the user is not stored in its raw form (without encryption) anywhere, thus, maintaining the information securely while causing 'on-the-fly' or real-time encryption of data.

In one embodiment of the present invention, the device driver employs a 256 bit encryption algorithm as set forth by the American Encryption Standard (AES) and known to those of ordinary skill in the art, however, any other types of encryption algorithms may be employed without departing from the scope and spirit of the present invention.

When information that was input is accessed by the user, it is decrypted by the device driver 134 using the same algorithm as that used to encrypt data and then provided to the user. Data is first retrieved by the storage driver 136 from the device 138, in its encrypted form, then decrypted by the driver 134 and then provided to the user.

Figure 14:
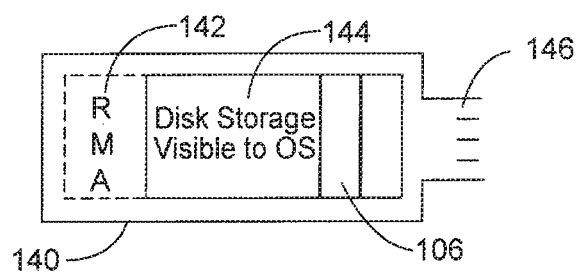
FIG. 14 depicts a storage device 140 in accordance with yet another embodiment of the present invention.

FIG. 14 depicts a storage device 140 in accordance with yet another embodiment of the present invention. The device 140 is similar to other storage devices discussed throughout this document with respect to other figures, such as the devices 12, 100 and 138. However the configuration of the device 140 is different in that the device 140 is shown to include a reserve memory area, which is an area including encrypted information and accessible only by the manufacturer of the device 140, such as Lexar Media, Inc. of Fremont, Calif.

The device 140 is shown to also include a disk storage area 144 visible, i.e. read and writable, to the operating system, a master boot record 106 and a port 146, which in one embodiment of the present invention may be a USB port for communicating with a host. Application software uses vendor unique commands to store/retrieve confidential user profile information to and from the reserve memory area 142.

System software encrypts data "on-the-fly" going into the reserved memory area 142 providing additional level of security for confidential user information and decrypts data, which is requested out of the reserved memory area. This is discussed in greater detail hereinabove. The embodiment of FIG. 14 prevents cloning of the device 140 through snooping because the reserve memory area 142 is not 'seen' by any software applications or the operating system and is only 'seen' by the manufacturer of the device 140.

The manufacturer of the device 140 determines vendor unique commands and uses the same in a firmware program to read and write information to the reserve memory area 142. This keeps the information stored within the reserve memory area 142 confidential and can include such information as user profile, fingerprint templates, password provided by the user to access the secure partition, user's web links and associated 'user name' and 'password' pairs to access web accounts and/or encrypted security key used to encrypt the reserve memory area 142.

Fingerprint templates are stored fingerprint information used to verify a valid user by comparing the user's fingerprint information to the fingerprint templates searching for a match. The user, at one time, performs a fingerprint swipe and the user's fingerprint information is then stored within the reserve memory area 142.

Figure 15:
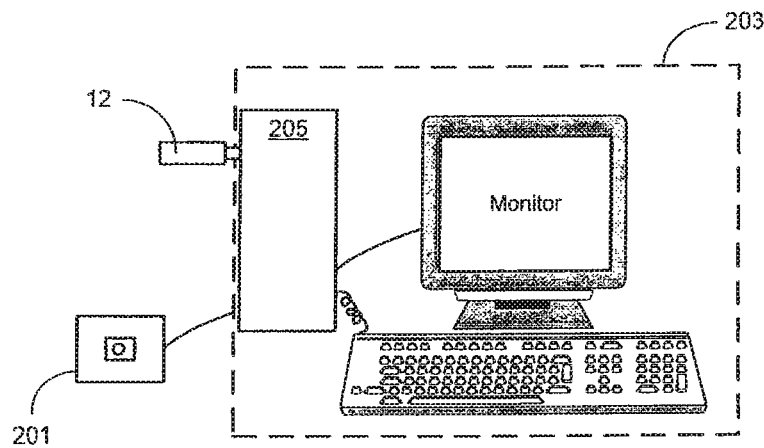
FIG. 15 shows an example of an application of the device 12 in accordance with an embodiment of the present invention.

FIG. 15 shows an example of an application of the device 12 in accordance with an embodiment of the present invention. In FIG. 15, a PC system 203 is shown to include a PC 205 coupled to the device 12 through the port 18. The PC is further shown coupled lo a finger swiping device 201 for obtaining the fingerprint of a user and transmitting the same to the PC 205 for storage within the device 12, as earlier discussed. In an alternative embodiment, the device 201 is replaced with the user entering a password. The PC 205 is an example of a host.

Figure 16:
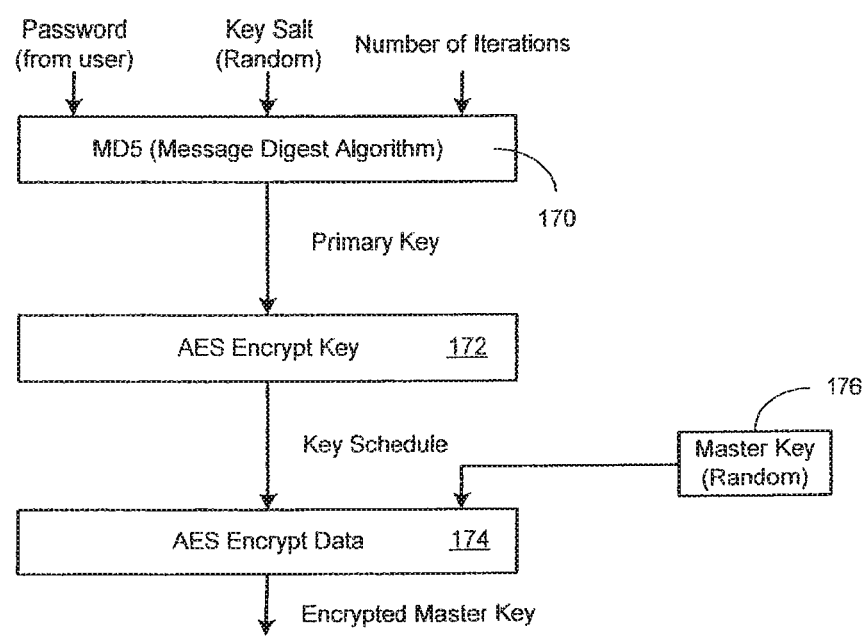
FIGS. 16-20 relate to another embodiment of the present invention, namely a double or two-key encryption process.

FIGS. 16-20 relate to another embodiment of the present invention, namely a double or two-key encryption process. Referring now to FIG. 16, a flow chart is presented to show the steps performed, in accordance with another embodiment of the present invention, for encryption of the master key. a double or two-key encryption process. That is, using a password obtained from a user, a primary key and a master key are used to encrypt data but if a user chooses to change his/her password, the master key is altered but the primary key remains the same. Thus, when a user changes his/her password, the primary key, which is used to generate the master key, remains the same but a new master key is generated using the new password from the user.

A 'key' as used herein refers to an electronic number that is generated from a random key generator, which makes the key a unique number not readily repeated when another random number is generated and not readily known due to its random nature. The encryption technique employed is similar to that discussed hereinabove.

Perhaps some figures showing the way in which keys are generated is helpful at this time. Referring back to FIG. 16, at step 170, a password that is obtained from the user is combined (using exclusive OR Boolean functions although other types of combining are anticipated) with a key salt, which is a random number and the number of iterations the password and key salt are combined to yield a primary key, which then becomes input to step 172. At step 172, the primary key is encrypted using known encryption schemes, such as the AES encryption method mentioned hereinabove.

Next, at step 174, the primary key and a master key, which is another random number are encrypted using known encryption techniques and an encrypted master key is generated.

Figure 17:
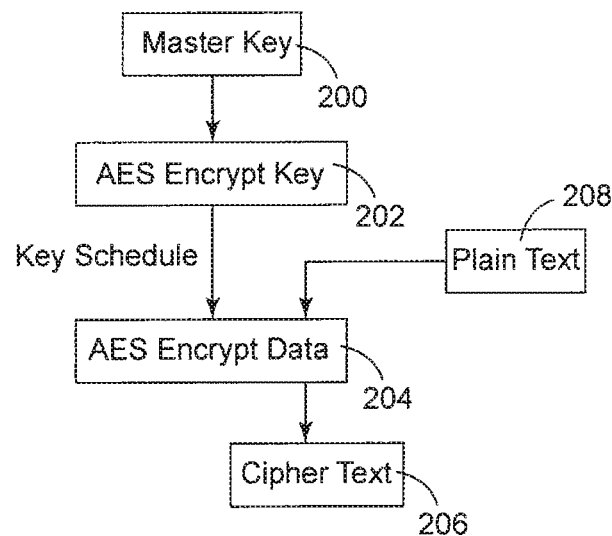

FIG. 17 shows a flow chart of the way in which data, entered by the user, is encrypted, in real-time. At step 200, the master key (same as the master key 176 of FIG. 16) is encrypted at step 202 using known encryption schemes and at step 204, the data entered by the user at 208 is encrypted with the output of step 202 resulting in what is referred to as cipher text at 206 or encrypted data.

Figure 18:
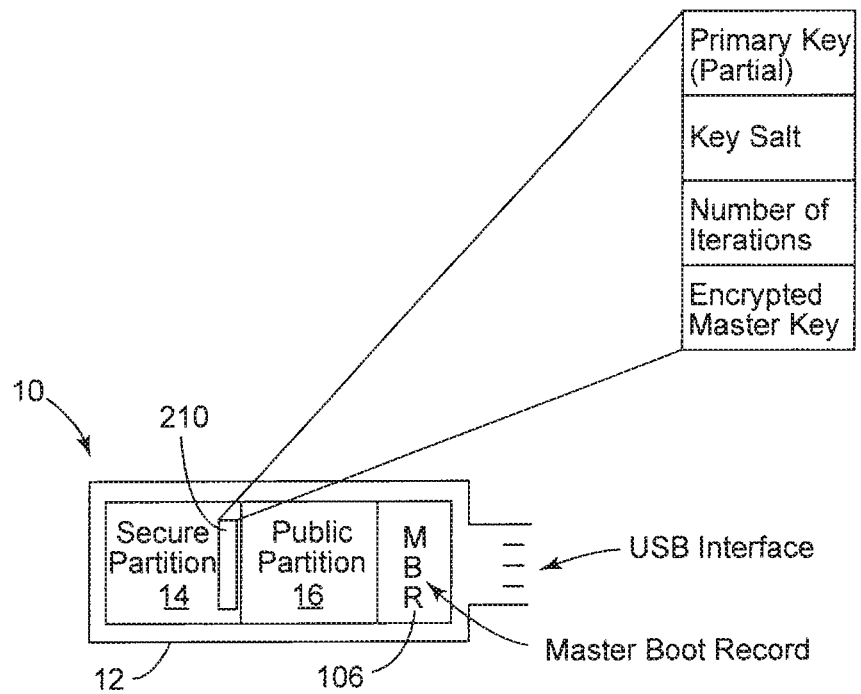
Figure 19:
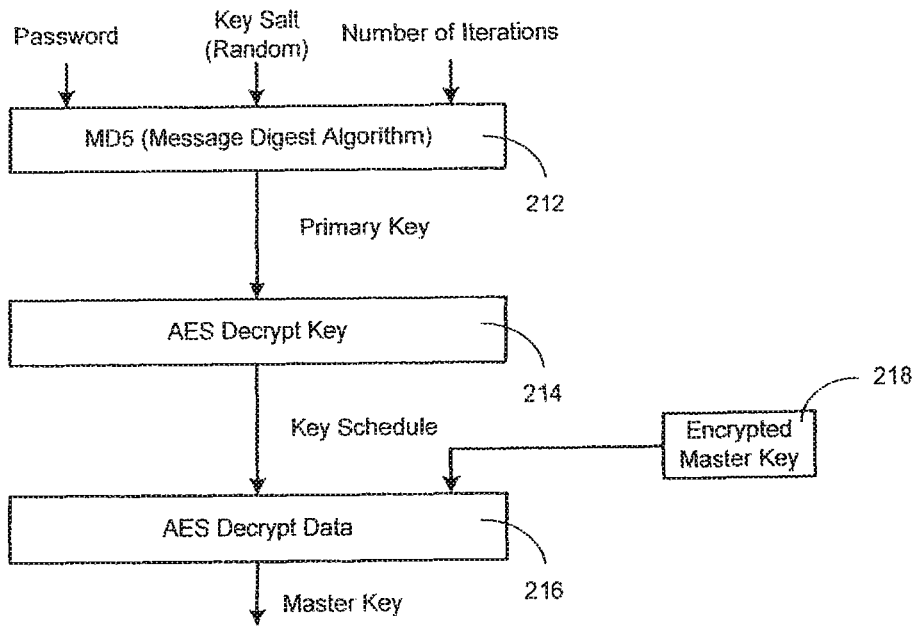

FIG. 18 shows the system 10 including the device 12 and the secure partition 14 and the public partition 16 and the master boot record 106, similar to that of previous figures, however, at 210, a storage area 210 is shown, within the secure partition 14, for storing a portion of the primary key, the key salt, the number of iterations and the encrypted master key, which are used in the steps of FIGS. 16, 17 and 19.

FIG. 19 shows a flow chart of the steps performed in decrypting the master key. At step 212, a user password is combined with a key salt and the number iterations and a primary key is generated. Next, at step 214, a key schedule is generated from the primary key and, at step 216, it is used to decrypt the encrypted master key at 218.

Figure 20:
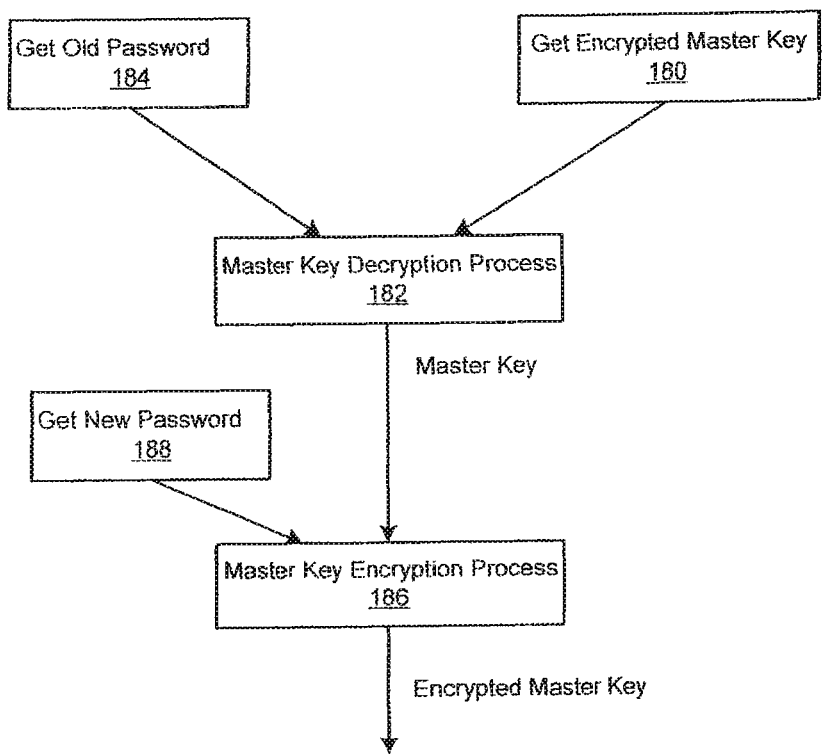

FIG. 20 shows a flow chart of the steps performed when a user wishes and does change his/her password from that used in FIG. 16. This is the reason for using a two-key encryption process, i.e. while the user may change his/her password, the master key remains the same. The user password of FIG. 16 will now be referred to as an 'old' password and the password the user wishes to change to will be referred to as a 'new' password.

At step 180, the encrypted master key is read and at step 184, the user's old password is obtained. At step 182, the read encrypted master key is decrypted using the old password that is obtained at 184 and by processing the steps discussed in FIG. 19. At step 186, the master key is combined with the new password, obtained at 188 from the user and encrypted resulting in an encrypted master key. A portion of the primary key and the encrypted master key are stored in the secure partition, thus, they will not be destroyed, modified or deleted by a user or undesirable intruders.

Figure 21:
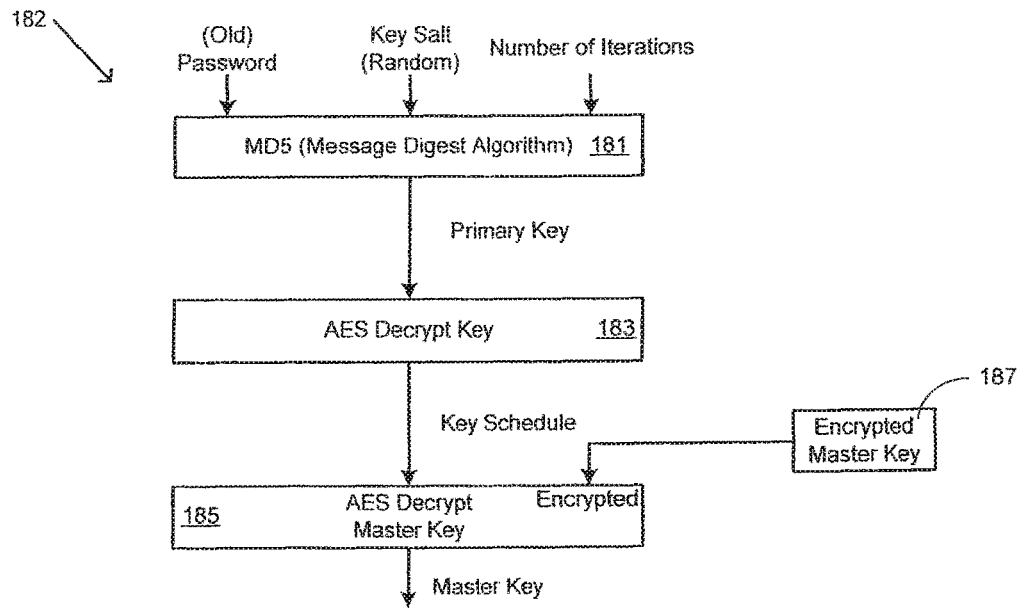
FIG. 21 shows a flow chart of the steps performed when performing step 182 of FIG. 20.

FIG. 21 shows a flow chart of further steps performed during step 182 of FIG. 20. At step 181, the old password and a key salt (random in nature) and the number of iterations are combined to generate the primary key. Next, while not shown in FIG. 21, a portion of the generated primary key is compared to the portion of the stored primary key in the secure area and if they are found equal, the user is successfully authenticated and the process continues to step 183, otherwise, the process does not continue passed step 181.

At step 183, a key schedule is generated using an AES decrypt key module or software program for use in decrypting the encrypted master key. Next, at step 185, the encrypted master key at 187 is decrypted to generate a master key, which is obviously based on the old password.

Figure 22:
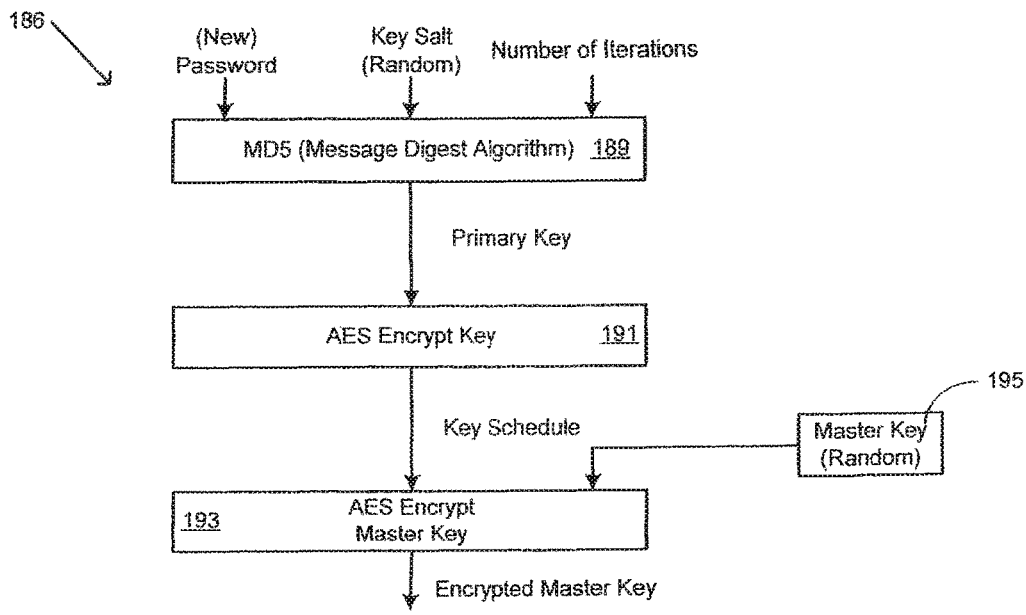
FIG. 22 shows a flow chart of the steps performed when performing step 186 of FIG. 20.

FIG. 22 shows a flow chart of the steps performed during performance of the step 186 of FIG. 20. At step 189, a new password, obtained from the user, is combined with a random key salt and the number of iterations to generate a primary key, which is then used by step 191 to generate a key schedule and at step 193, the master key (un-encrypted) at 195 is encrypted to generate the encrypted master key.

The encryption device driver 134 of FIG. 13 causes the steps of FIGS. 16, 17, 19, 20, 21 and 22.

Although the present invention has been described in terms of specific embodiments, it is anticipated that alterations and modifications thereof will no doubt become apparent to those more skilled in the art.

What is claimed is:

1. A method of operating a storage system, comprising:
   receiving a password at a device driver of the storage system from a host of the storage system, wherein the host is in communication with a removable storage device of the storage system through the device driver, and wherein the device driver is configured to enable a software program of the host to communicate to the removable storage device;
   using the device driver to combine the password, a key salt, and a number of iterations to generate a primary key;
   using the device driver to generate a key schedule from the primary key;
   receiving an encrypted master key at the device driver from the removable storage device; and
   using the device driver to decrypt the encrypted master key with the key schedule.

2. The method of claim 1, wherein using the device driver to combine the password, the key salt, and the number of iterations comprises the device driver using an exclusive "OR" or Boolean functions.

3. The method of claim 1, further comprising storing a portion of the primary key in a secure storage area of the removable storage device.

4. The method of claim 1, wherein receiving the encrypted master key at the device driver from the removable storage device comprises receiving the encrypted master key at the device driver from a secure area of the removable storage device.

5. The method of claim 1, wherein the primary key is used by the device driver to determine whether a user is allowed to change the password.

6. The method of claim 5, wherein the primary key being used by the device driver to determine whether the user is allowed to change the password comprises using the device driver to determine whether a portion of the primary key matches a portion of a primary key that is stored in a secure storage area of the removable storage device.

7. The method of claim 6, further comprising allowing the user to change the password when the portion of the primary key matches the portion of the primary key that is stored in the secure storage area of the removable storage device.

8. The method of claim 1, further comprising using the device driver to compare a portion of the primary key to a portion of a primary key that is stored in a secure storage area of the removable storage device before using the device driver to generate the key schedule from the primary key.

9. The method of claim 8, further comprising using the device driver to generate the key schedule from the primary key only when the portion of the primary key matches the portion of the primary key that is stored in the secure storage area of the removable storage device.

10. The method of claim 8, wherein the secure storage area of the removable storage device is only accessible and/or readable by use of vendor unique commands.

11. The method of claim 1, wherein the removable storage device comprises a read only master boot record.

12. The method of claim 1, wherein the password is an old password, and further comprising using the device driver to combine the decrypted master key with a new password.

13. The method of claim 1, wherein the password is an old password, and further comprising using the device driver to encrypt the decrypted master key in response to receiving a new password at the host.

14. The method of claim 13, wherein the key salt is a first key salt, the primary key is a first primary key, and the key schedule is a first key schedule, and wherein using the device driver to encrypt the decrypted master key in response to receiving a new password at the host comprises:
   using the device driver to combine the new password, a second key salt, and the number of iterations to generate a second primary key;
   using the device driver to generate a second key schedule from the second primary key; and
   using the device driver to encrypt the decrypted master key with the second key schedule.

15. A method of operating a storage system, comprising:
   receiving a password at a device driver of the storage system from a host of the storage system, wherein the host is in communication with a removable storage device of the storage system through the device driver, and wherein the device driver is configured to enable a software program of the host to communicate to the removable storage device;
   using the device driver to combine the password, a key salt, and a number of iterations to generate a first primary key;
   using the device driver to determine whether a portion of the first primary key matches a portion of a second primary key stored in a secure storage area of the removable storage device;
   using the device driver to generate a key schedule from the first primary key in response to the portion of the first primary key matching the portion of the second primary key;
   receiving an encrypted master key at the device driver from the removable storage device; and
   using the device driver to decrypt the encrypted master key with the key schedule.

16. The method of claim 15, wherein using the device driver to combine the password, the key salt, and the number of iteration comprises the device driver using an exclusive "OR" or Boolean functions.

17. The method of claim 15, wherein the password is an old password, and further comprising using the device driver to combine a new password with the decrypted master key to encrypt the decrypted master key.

18. A method of operating a storage system, comprising:
receiving an old password at a device driver of the storage system from a host of the storage system, wherein the host is in communication with a removable storage device of the storage system through the device driver, and wherein the device driver is configured to enable a software program of the host to communicate to the removable storage device;
using the device driver to combine the old password, a first key salt, and a number of iterations to generate a first primary key;
using the device driver to determine whether a portion of the first primary key matches a portion of a second primary key stored in a secure storage area of the storage device;
using the device driver to generate a first key schedule from the first primary key in response to the portion of the first primary key matching the portion of the second primary key;
receiving an encrypted master key at the device driver from the removable storage device;
using the device driver to decrypt the master key with the first key schedule;
receiving a new pass word at the device driver;
using the device driver to combine the new password, a second key salt, and the number of iterations to generate a third primary key;
using the device driver to generate a second key schedule from the third primary key; and
using the device driver to encrypt the decrypted master key with the second key schedule.

19. The method of claim 18, wherein the secure storage area of the removable storage device is only accessible and/or readable by use of vendor unique commands.

20. The method of claim 18, wherein the removable storage device comprises a read only master boot record.

* * * * *